United States Patent
Grethel et al.

(10) Patent No.: US 7,360,359 B2
(45) Date of Patent: Apr. 22, 2008

(54) HYDRAULIC SYSTEM HAVING AN EMERGENCY RELEASE MECHANISM FOR A CLUTCH HAVING SERVO-ASSISTED PEDAL ACTUATION

(75) Inventors: Marco Grethel, Buehlertal (DE); Franz Benz, Achern (DE)

(73) Assignee: LuK Lamellen und Kupplungsbau Beteitigungs KG, Buehl (DE)

(*) Notice: Subject to any disclaimer, the term of this patent is extended or adjusted under 35 U.S.C. 154(b) by 1 day.

(21) Appl. No.: 11/312,258

(22) Filed: Dec. 20, 2005

(65) Prior Publication Data

US 2006/0131123 A1   Jun. 22, 2006

(30) Foreign Application Priority Data

Dec. 22, 2004  (DE) .................. 10 2004 062 981

(51) Int. Cl.
*F16D 48/02* (2006.01)
*F16D 25/00* (2006.01)

(52) U.S. Cl. ........................ 60/547.1; 192/83

(58) Field of Classification Search ............ 60/403, 60/405, 406, 547.1, 550, 582, 591; 192/32, 192/83, 85 AA, 85 CA, 85 C
See application file for complete search history.

(56) References Cited

U.S. PATENT DOCUMENTS

| | | | |
|---|---|---|---|
| 3,752,282 A * | 8/1973 | Espenshied | 60/547.1 |
| 6,094,976 A * | 8/2000 | Hayashi et al. | 73/118.1 |
| 6,170,624 B1 * | 1/2001 | Arai et al. | 192/83 |
| 6,607,060 B2 * | 8/2003 | Inoue | 192/91 R |

FOREIGN PATENT DOCUMENTS

WO   WO 2004/053348 A2   6/2004

\* cited by examiner

*Primary Examiner*—Thomas E. Lazo
(74) *Attorney, Agent, or Firm*—Davidson, Davidson & Kappel

(57) ABSTRACT

To disengage a clutch using the clutch actuation in the event of a failure of the system, having pedal force-assisted pressurization of the hydraulic system, composed of two hydraulic circuits, a master cylinder and a slave cylinder being essentially disposed in the first circuit, and an electromotor-driven pump being in the second circuit, and the two circuits communicating with one another in a mutually controllable fashion via a valve block having a pressure slide valve and a pressure-valve spring, an emergency release mechanism is provided in the hydraulic system.

6 Claims, 5 Drawing Sheets

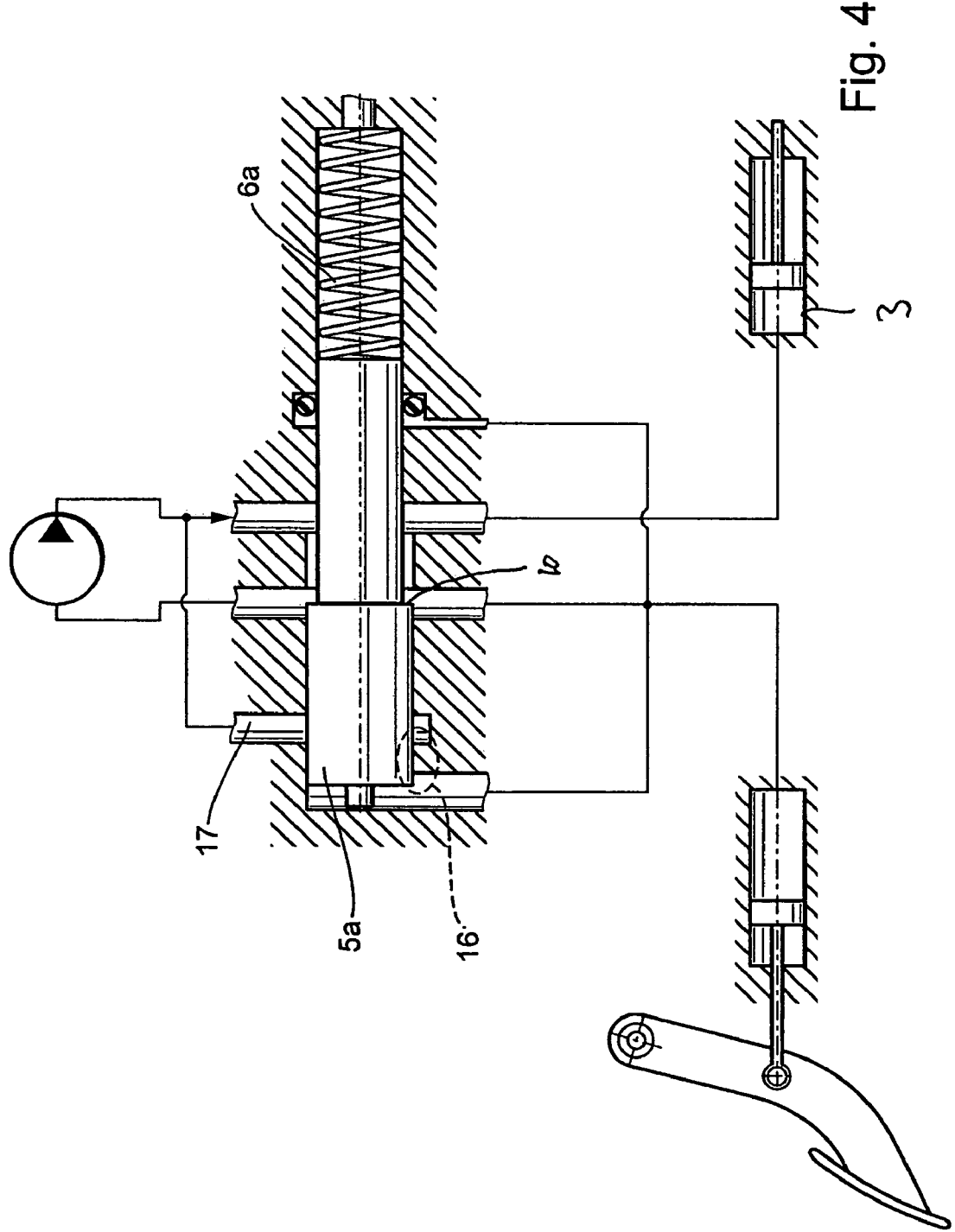

HYDRAULIC SYSTEM HAVING AN EMERGENCY RELEASE MECHANISM FOR A CLUTCH HAVING SERVO-ASSISTED PEDAL ACTUATION

This claims the benefit of German Application No. 10 2004 062 981.1, filed Dec.22, 2004 and hereby incorporated by reference herein.

BACKGROUND

The present invention is directed to a hydraulic system for pressurizing a clutch having an emergency release mechanism, into which a device for increasing pressure is integrated in order to reduce the pedal force. Typically, such a pressure increase is produced by an electrical pump, which additionally increases the pressure between the master cylinder and the slave cylinder in the hydraulic system. This pump is electronically controlled by pressure sensors, for example, since the pump pressure is dependent on the pressure prevailing in the hydraulic system. However, when this pump or the electromotor experiences a failure, the clutch is not able to be actuated, not even in response to an increased expenditure of force. The reason for this lies in the structural design requirements of servo power assistance in normal operation.

From the related art, approaches are known for clutches that are actuatable by electromechanical actuators. In the event of a power failure in the drive system, for instance, the actuator remains in the currently active position, and the clutch can no longer be disengaged. To be able to nevertheless disengage the clutch in such a situation, an emergency release valve is employed between the master cylinder and the slave cylinder, to enable the hydraulic system to be manually or automatically disengaged. By opening the valve in this manner, the pressure in the reservoir is relieved and the engaged clutch is disengaged.

PCT Patent Application WO 2004/053348 A2 describes an approach for disengaging the clutch in the event that the elements required for clutch actuation fail. For example, if an element required for clutch actuation fails at a time when one or more clutches are engaged, an option is provided for disengaging the clutch or the clutches in order to tow the vehicle. This is accomplished, for example, by relieving the hydraulic system in that the pressure line is opened and thereby depressurized or in that the master cylinder is relieved.

In an approach for pressurizing the clutch using pedal force assistance, other components in the hydraulic system, such as the electromotor and the hydraulic pump, which are likewise no longer able to execute their function in the event of a power failure, also supervene. The result is that the clutch or, in the case of a twin clutch, both clutches are no longer able to be disengaged, not even in response to an increased expenditure of force.

BREIF SUMMARY OF THE INVENTION

It is, therefore, an object of the present invention to enable the clutch to be disengaged in the event of a system failure, by using the clutch actuation and by employing a simple means.

The present invention provides two hydraulic circuits make up the hydraulic system used for a pedal force-assisted pressurization of a clutch actuation. Disposed essentially in the first circuit are a master cylinder and a slave cylinder, and, in the second circuit, a pump driven by an electromotor. The two circuits are connected via a valve block having a pressure slide valve and a pressure-valve spring and are mutually controllable by the same. In the event of failure of the system, it is possible to disengage the clutch using an emergency release mechanism provided in this hydraulic system.

This emergency release mechanism may be advantageously constituted of at least one leakage site, which may be an orifice, nozzle or vent, or even a gap. The purpose of this at least one leakage site in the hydraulic system is to permit pressurized media to escape from the hydraulic system by actuating the clutch pedal with an increased expenditure of force, thereby reducing the pressure and, as a result, enabling the clutch to be disengaged. This method of reducing pressure in the hydraulic system in order to disengage a clutch in case of an emergency, represents an especially cost-effective variant.

Another advantageous embodiment of the inventive idea may provide for employing at least one pressure relief valve in the hydraulic system. In this context, this pressure relief valve is advantageously selected to have a response threshold that is slightly higher than the pressure normally emanating from the master cylinder during vehicle operation. Thus, a slight rise in pressure in the hydraulic system downstream of the master cylinder already causes a "failure in the system" to be signaled in the pressure relief valve, which immediately responds. In this manner, the pressure in the system may likewise be reduced by clutch-pedal actuation.

Alternatively thereto, it may be particularly advantageous to simulate an overpressure function corresponding to that of a pressure relief valve, in the valve block itself, i.e., using the pressure slide valve and pressure-valve spring components located in the same. Thus, the dimensions, in particular the lengths of the pressure-valve plunger and the pressure-valve spring, are effectively modeled on the compressive forces possibly occurring at the valve block, in equivalence to the clutch force characteristic. Depending on what the spatial conditions in the valve block allow, the pressure-valve plunger and/or the pressure-valve spring may be lengthened. Moreover, for this embodiment, it may be important to consider the specific spring force when selecting the pressure-valve spring to be used, as it ultimately also influences the length.

In this embodiment, it may be especially beneficial for an overpressure function to be directly integrated into the valve block in this manner, since it eliminates the need for introducing additional components into the hydraulic system to effect a pressure reduction.

BRIEF DESCRIPTION OF THE DRAWINGS

The present invention is explained in greater detail below with reference to an exemplary embodiment. In the drawing:

FIG. 4 shows another variant of an emergency release mechanism for a pedal force assistance according to the present invention.

DETAILED DESCRIPTION OF A PREFERRED EMBODIMENT

Figure 1:
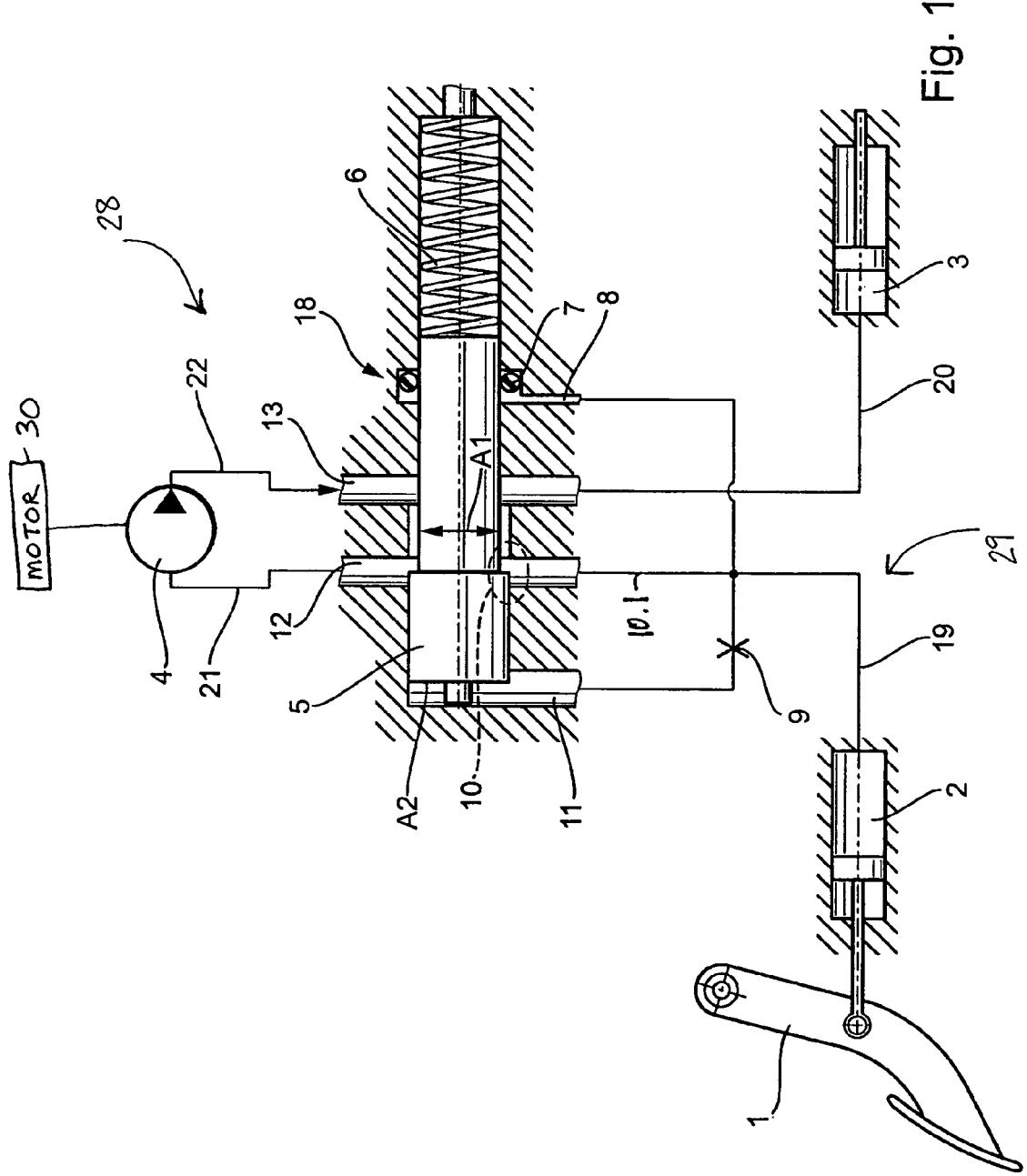
FIG. 1 illustrates a related art pedal force assistance employed between a master cylinder and a slave cylinder.

FIG. 1 schematically illustrates a related art an assistance for a pedal force actuation without the use of an emergency release mechanism according to the present invention. This servo power assistance is advantageously employed between a first line section 19 and a second line section 20, thus between master cylinder 2 and slave cylinder 3, and is constituted of a hydraulic pump 4 having an upstream valve block 18. Valve block 18 may just as well be located directly at master cylinder 2 or slave cylinder 3. Located essentially in the housing of valve block 18 are a pressure slide valve 5 and a pressure-valve spring 6, slide valve 5 being pressurized by pressure-valve spring 6 in response to its specific spring force. A seal 7 can be connected via a line 8 to the first line section 19. Valve block 18 has a plurality of connection ports, which communicate with pressure channels 11, 12 and 13. Pressure channel 13 is not only connected to valve block 18, but to second line section 20 as well. Channel 11 communicates with first line section 19, into which a damping orifice or a throttling valve 9 is introduced. In addition, first line section 19 communicates with pressure channel 10.1 and thus with control edge 10 of valve block 18. Pressure channel 12 ultimately establishes a connection to inlet 21 of pump 4.

Under the related art, two hydraulic circuits make up the hydraulic system in order to provide servo power assistance at clutch pedal 1. The first of these is the "normal" circuit 28 for pressurizing the clutch which runs between master cylinder 2 and slave cylinder 3, i.e. between clutch pedal 1 up to the clutch controller, i.e. the clutch disengaging system, actuated by slave cylinder 3. The second of these circuits is the hydraulic circuit 29 in which a hydraulic pump 4 is driven by the an electromotor 30. Both circuits pass by way of valve block 18, thereby enabling a connection to be established between the two circuits. In response to non-actuation of clutch pedal 1, the two circuits communicate with one another, but operate independently of one another, the circuits passing without pressure intensification through valve block 18. As illustrated in FIG. 1, master cylinder 2 communicates with first line section 19 and slave cylinder 3 with second line section 20. In addition, hydraulic pump 4 communicates via its inlet 21 with first line section 19 and via its outlet 22 with second line section 20. The pumping direction of hydraulic pump 4 from inlet 21 to outlet 22 is indicated by an arrow. Each circuit 28, 29 is located on one side of the slide valve 5.

In response to actuation of clutch pedal 1 by the driver or by an electrical actuator, the mechanical connection between clutch pedal 1 and master cylinder 2 causes the piston employed in master cylinder 2 to be axially displaced in the direction of slave cylinder 3, in order to pressurize the hydraulic medium contained in first line section 19 and, respectively, in second line section 20. Thus, the pressure rises in the first circuit. Without power assistance or servo power assistance, this pressure would be transmitted as unboosted pressure via second line section 20 to the piston of slave cylinder 3.

By incorporating a servo power assistance downstream of master cylinder 2, the hydraulic medium pressurized by clutch pedal 1 is initially conducted via first line section 19 by way of channel 11, to valve block 18. The result is that, at the right pressure, the preloading force of pressure-valve spring 6, that had previously retained pressure-valve plunger 5 of valve block 18 in a position that allowed the flow of pressurized media through the two circuits, is overcome. In the process, pressure slide valve 5 is axially displaced to the point where the pressure built up from the master cylinder 2 side and acting on effective surface area A2 of pressure slide valve 5 is greater than the spring force applied by pressure-valve spring 6 to pressure slide valve 5, respectively, the pressure acting on surface area A2 minus A1 of pressure slide valve 5. Consequently, the control edge or opening 10 where pressure channel 10.1 and pressure slide valve 5 meet is reduced. As a result, the pressure in the circuit of hydraulic pump 4 rises. In this case, the maximum pressure is transmitted out of the second circuit into the first circuit portion via line sections 13 and 20 and is superposed on the same.

If the second circuit 28 fails due to an internal defect (failure of pump 4 or of the motor of pump 4), without a safety mechanism, the clutch would no longer be actuatable, since the second circuit, that had retained pressure slide valve 5 in valve block 18 in a "locked position" for pressure channels 12 and 13 for the first circuit, would consequently drop out as well. In other words, sufficient counter pressure from line sections 13 and 20 against the surface A2 minus A1 may be unavaliable. If failure occurs, no matter how hard the clutch pedal 1 is depressed, the clutch cannot be disengaged.

Figure 2:
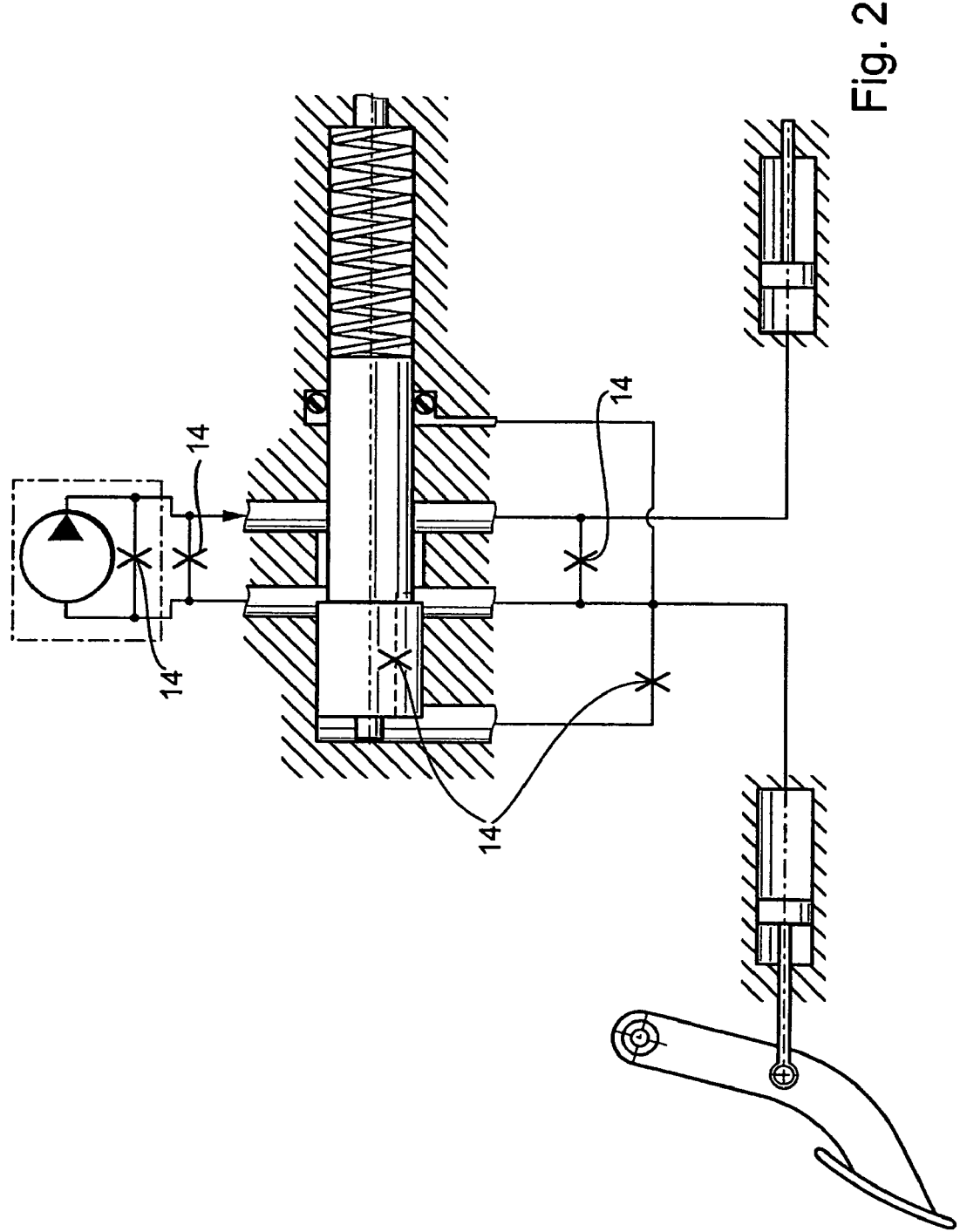
FIG. 2 depicts a pedal force assistance including an emergency release mechanism according to the present invention in the form of leakage sites.

FIG. 2 shows a hydraulic system including a servo-assisted pedal actuation in accordance with FIG. 1, including an approach whereby an emergency release mechanism is integrated in this system according to the present invention. In this case, this emergency release mechanism is constituted of leakage sites 14 (orifices, nozzles or vents, or gaps), which are provided in a selective and specific manner at one or more locations within this hydraulic system, but are designed to have a negligible effect on the pressure buildup during normal driving operation. However, in the event of a system failure, it is thereby ensured that the clutch will disengage again in response to actuation of clutch pedal 1 using a substantially higher pedal force. In other words, further pressure on master cylinder 2 will force hydraulic fluid through the leakage sites so that even in the event of a failure of pump 4, the clutch can be disengaged.

Figure 3A:
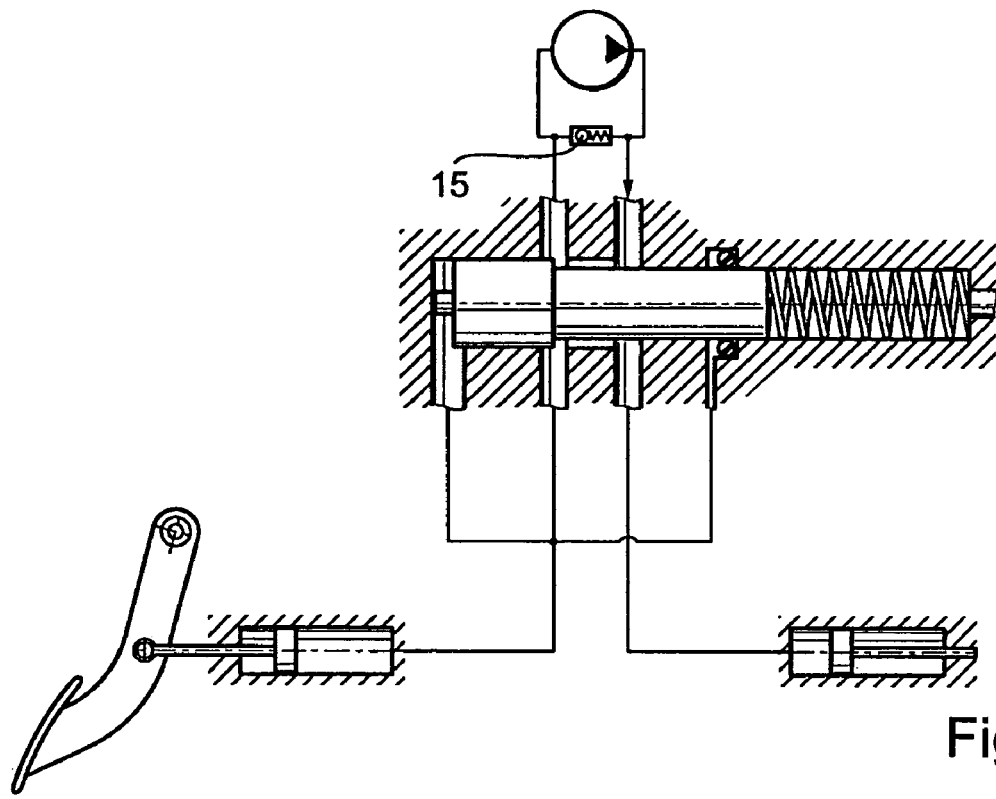
FIGS. 3a through 3c show a pedal force assistance including an emergency release mechanism according to the present invention in the form of pressure relief valves.
Figure 3B:
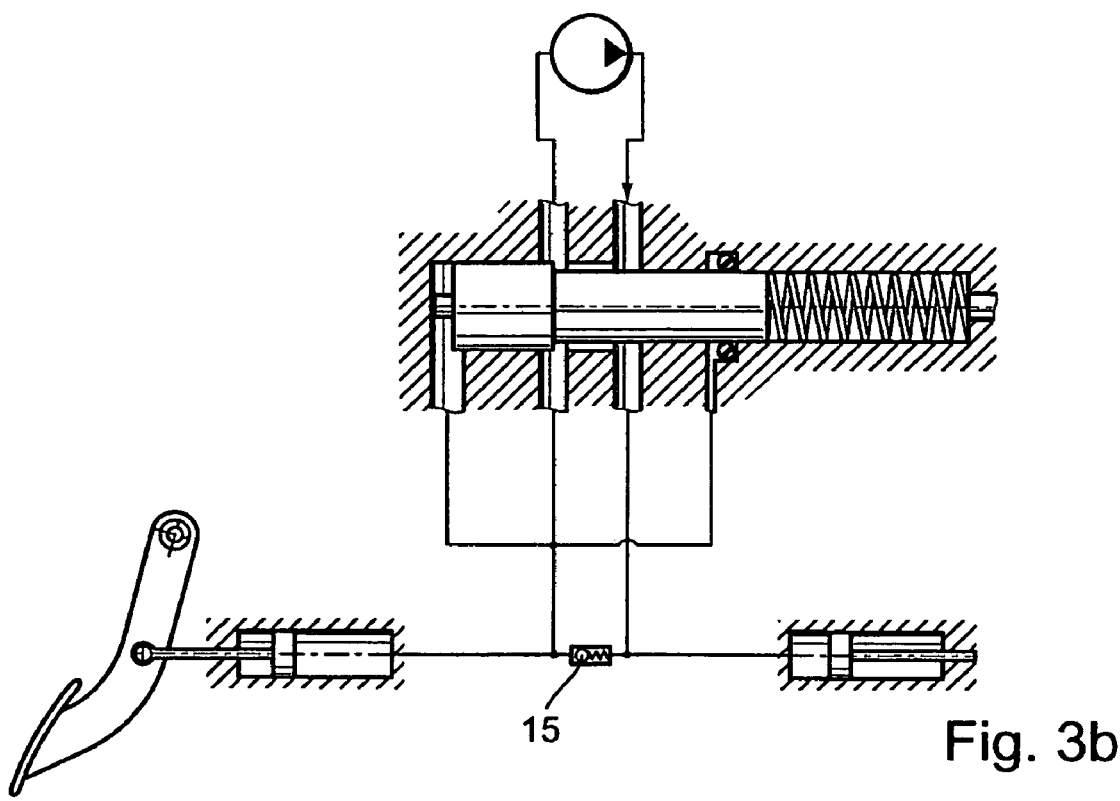
Figure 3C:
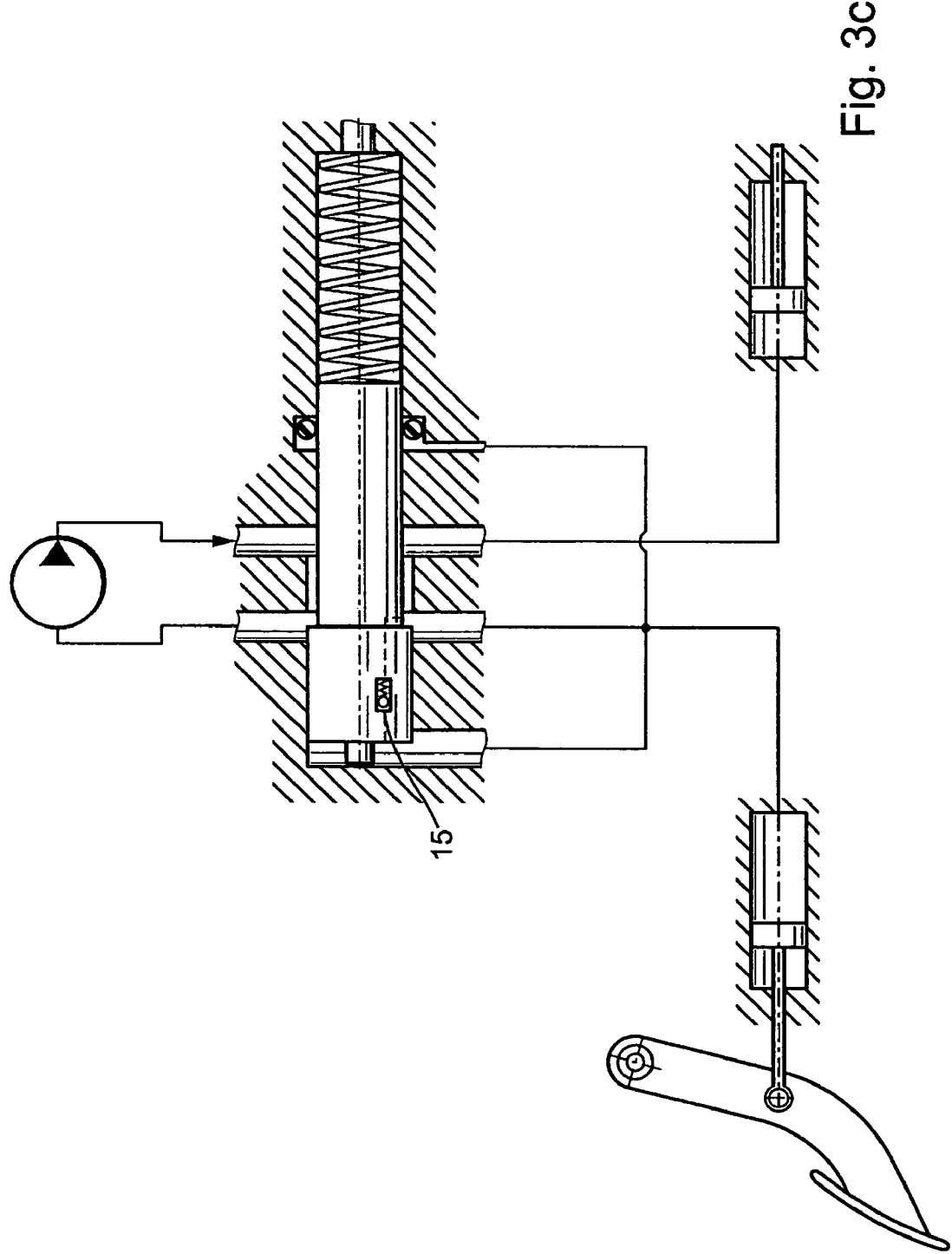

FIGS. 3a through 3c illustrate another design approach for an emergency release mechanism, which, in this case, is constituted of at least one pressure relief valve 15 (for example, a ball-spring valve), which is introduced into the hydraulic system. It functions by responding to a slight increase in pressure over the pressure prevailing in the master cylinder during normal operation. Incorporating this pressure relief valve 15 substantially improves the performance in the event of a system failure. In this case, there is no longer a need for the volumetric flow from master cylinder 2 to slave cylinder 3 to be directed through leakage sites. For this reason, faster clutch operations are possible, even in the event of system failure. These operations require that a force be expended that is only slightly higher than without servo power assistance. The at least one pressure relief valve 15 may, similarly to FIG. 2, be placed at various locations within the hydraulic system, a direct integration into one of the components, pump 4, master cylinder 2 or slave cylinder 3, being possible.

Alternatively to the approaches described up to this point, as an emergency release mechanism, it is possible for an overpressure function to be produced in valve block 18 using the components located in valve block 18, i.e., pressure-valve plunger 5 and/or pressure-valve spring 6, by making appropriate geometric modifications to the same. This alternative approach is illustrated in FIG. 4. To this end, pressure-valve spring 6 is lengthened, enabling it to execute a longer travel, with the result that a greater power buildup and, accordingly, a higher clutch-pedal force are able to be realized than without servo power assistance. In normal operation, pressure-valve plunger 5 operates at control edge 10. A failure of pump 4 or of the electromotor alters the force ratios at control edge 10, completely locking the same. Contrary to the dimension of pressure-valve plunger 5 indicated in FIG. 1, it is, at this point, able to be displaced clearly beyond control edge 10 in response to a further increasing pressure on the master cylinder side, until pressure-valve plunger 5 releases control edge 16 and the volumetric flow is able to flow from master cylinder 2 over control edge 16, through an integrated additional lamella 17 (schematically indicated in FIG. 4) to slave cylinder 3.

REFERENCE NUMERAL LIST 1 clutch pedal
2 master cylinder
3 slave cylinder
4 pump/hydraulic pump
5 pressure-valve plunger/pressure slide valve
5a lengthened pressure slide valve
6 pressure-valve spring
6a lengthened pressure-valve spring
7 pressure-valve seal
8 relief of seal
9 damping orifice/throttling valve
10 control edge of slide valve
10.1 pressure channel
11 channel master-cylinder pressurized chamber
12 pressure channel from master cylinder
13 pressure channel from slave cylinder
14 leakage site
15 pressure relief valve
16 control edge for emergency actuation
17 additional lamella
18 valve block
19 first line section
20 second line section
21 inlet pump/hydraulic pump
22 outlet pump/hydraulic pump
28 first circuit
29 second circuit
30 electromotor

What is claimed is:

1. A hydraulic system having pedal force-assisted pressurization, comprising:
    a first and a second hydraulic circuit for a clutch actuation, a master cylinder and a slave cylinder being disposed in the first hydraulic circuit, and a pump driven by an electromotor being disposed in the second hydraulic circuit;
    a valve block, the first and second hydraulic circuits communicating with one another in a mutually controllable fashion via the valve block, the valve block having a pressure slide valve and a pressure-valve spring; and
    an emergency release mechanism for the clutch provided in the hydraulic system, the emergency release mechanism including at least one pressure relief valve with a response threshold selected to be slightly higher than pressure from the master cylinder during normal vehicle operation.

2. A hydraulic system having pedal force-assisted pressurization, comprising:
    a first and a second hydraulic circuit for a clutch actuation, a master cylinder and a slave cylinder being disposed in the first hydraulic circuit, and a pump driven by an electromotor being disposed in the second hydraulic circuit;
    a valve block, the first and second hydraulic circuits communicating with one another in a mutually controllable fashion via the valve block, the valve block having a pressure slide valve and a pressure-valve spring; and
    an emergency release mechanism for the clutch provided in the hydraulic system, the emergency release mechanism provided on the basis of length dimensions of the pressure slide valve and the pressure-valve spring within the valve block to provide an overpressure function.

3. A hydraulic system having pedal force-assisted pressurization, comprising:
    a first and a second hydraulic circuit for a clutch actuation, a master cylinder and a slave cylinder being disposed in the first hydraulic circuit, and a pump driven by an electromotor being disposed in the second hydraulic circuit;
    a valve block, the first and second hydraulic circuits communicating with one another in a mutually controllable fashion via the valve block, the valve block having a pressure slide valve and a pressure-valve spring; and
    an emergency release mechanism for the clutch provided in the hydraulic system;
    wherein the valve block includes a seal for the pressure slide valve, the seal being connected to the master cylinder pressure.

4. A hydraulic system having pedal force-assisted pressurization, comprising:
    a first and a second hydraulic circuit for a clutch actuation, a master cylinder and a slave cylinder being disposed in the first hydraulic circuit, and a pump driven by an electromotor being disposed in the second hydraulic circuit;
    a valve block, the first and second hydraulic circuits communicating with one another in a mutually controllable fashion via the valve block; and
    an emergency release mechanism for the clutch provided in the hydraulic system, the emergency release mechanism including at least one leakage site.

5. The hydraulic system as recited in claim 4 wherein the leakage site is characterized by an orifice, nozzle, vent or a gap.

6. A hydraulic system having pedal force-assisted pressurization, comprising:
    a first and a second hydraulic circuit for a clutch actuation, a master cylinder and a slave cylinder being disposed in the first hydraulic circuit, and a pump driven by an electromotor being disposed in the second hydraulic circuit;
    a valve block, the first and second hydraulic circuits communicating with one another in a mutually controllable fashion via the valve block; and
    an emergency release mechanism for the clutch provided in the hydraulic system, the emergency release mechanism including at least one pressure relief valve with a response threshold selected to be slightly higher than pressure from the master cylinder during normal vehicle operation.

* * * * *

UNITED STATES PATENT AND TRADEMARK OFFICE
CERTIFICATE OF CORRECTION

| | |
|---|---|
| PATENT NO. | : 7,360,359 B2 |
| APPLICATION NO. | : 11/312258 |
| DATED | : April 22, 2008 |
| INVENTOR(S) | : Marco Grethel and Franz Benz |

It is certified that error appears in the above-identified patent and that said Letters Patent is hereby corrected as shown below:

On the Title Page (73)
Assignee name should read: Luk Lamellen und Kupplungsbau Beteiligungs KG Signed and Sealed this Twenty-ninth Day of July, 2008

JON W. DUDAS
*Director of the United States Patent and Trademark Office*